United States Patent [19]
Kubota et al.

[11] Patent Number: 5,581,396
[45] Date of Patent: Dec. 3, 1996

[54] WAVELENGTH CONVERTING DEVICE HAVING AN EPITAXIAL WAVEGUIDE LAYER

[75] Inventors: Hirofumi Kubota; Kiyofumi Chikuma, both of Tsurugashima, Japan

[73] Assignee: Pioneer Electronic Corporation, Tokyo, Japan

[21] Appl. No.: 491,620

[22] Filed: Jun. 19, 1995

[30] Foreign Application Priority Data

Jun. 21, 1994 [JP] Japan ................. 6-139012

[51] Int. Cl.⁶ ............................... G02F 1/35
[52] U.S. Cl. ............................. 359/332; 252/582
[58] Field of Search ..................... 359/326–332, 359/1–3, 7; 385/122; 372/21, 22; 252/582, 584

[56] References Cited

U.S. PATENT DOCUMENTS

| | | |
|---|---|---|
| 5,218,661 | 6/1993 | Droste et al. ............... 385/122 |
| 5,335,062 | 8/1994 | Hofmeister et al. ............ 356/347 |
| 5,422,873 | 6/1995 | Kewitsch et al. ............ 359/2 X |
| 5,461,508 | 10/1995 | Ouwerkerk .................. 359/328 |

*Primary Examiner*—John D. Lee
*Attorney, Agent, or Firm*—Perman & Green

[57] ABSTRACT

A wavelength converting device comprises: a substrate; an epitaxial cladding layer of $K_3Li_{2-x}Nb_{5+x-y}Ta_yO_{15+2x}$ ($-0.4 \leq x \leq 0.20$, $0 \leq y \leq 0.33$) deposited on the substrate by metalorganic compound gases including lithium, potassium, tantalum and niobium respectively by using a MOCVD method; and an epitaxial waveguide layer of $K_3Li_{2-x'}Nb_{5+x'-y'}Ta_{y'}O_{15+2x'}$ ($-0.4 \leq x' \leq 0.20$, $0 \leq y' \leq 0.33$, $x+0.0005 \leq x' \leq x+0.005$ and $x' \neq x$) deposited on the epitaxial cladding layer by metalorganic compound gases including lithium, potassium, tantalum and niobium respectively by using the MOCVD method and having a refractive index larger than that of the epitaxial cladding layer thereby operat-able with a high thermal and electrical stability and a high output even when driven by a high load optical power.

5 Claims, 2 Drawing Sheets

1

WAVELENGTH CONVERTING DEVICE HAVING AN EPITAXIAL WAVEGUIDE LAYER

BACKGROUND OF THE INVENTION

1. Field of the Invention

The present invention relates to a wavelength converting device for generating a secondary harmonic of incident light, which has a nonlinear optical crystalline waveguide utilizing a Second Harmonic Generation (SHG).

2. Description of the Related Art

In the wavelength converting device, it is necessary to satisfy the phase matching condition in order to perform effectively the SHG. For this, there are phase matching method such as an angle-tuning, a temperature-tuning and an electric-field-tuning which utilize birefringence of the substrate crystal in the wavelength converting device so as to satisfy the phase matching condition. Further, there are attempts using a mode dispersion in the waveguide such as a method for changing the film thickness, a method for providing an over-layer, a method for using the Cherenkov radiation or quasi-phase matching.

A ferroelectric having a large nonlinear optical constant such as $LiTaO_3$ (hereinafter referred to as LT), $LiNbO_3$ (hereinafter referred to as LN) or $KTiOPO_4$ is preferably used for the material of the substrate of the wavelength converting device. A bulk crystal of $LiNb_{1-x}Ta_xO_2$ ($0 \leq x \leq 1$) (hereinafter referred to as LNT), for example, is produced by the CZ method or TSSG method in which the crystal is pulled up from its fused fluid or the micro crystal manufacturing method in which the crystal is pulled up through a nozzle. However, these methods have problems in a high quality and high homogeneity of the resultant crystal, and difficulties for enlarging the crystal and forming its waveguide shape. Thus, it is attempted that a LNT crystal thin film is formed on a substrate such as sapphire in a sputtering method.

In addition, there is had been developed a plasma-vapor-phase-growth method in which a single crystal film or LNT is deposited on the sapphire substrate (Japanese Patent Kokoku No. 5-11078). According to this method, Li, Ta and Nb are oxidized in an oxygen plasma and then a LNT single crystal film or epitaxial growth is preformed on the sapphire substrate.

LNT is a ferroelectric having a high melting point and a high Curie point. There is known that LNT has an electromechanical coupling coefficient larger than those or other ferroelectrics. Furthermore, since LNT has a high nonlinear optical constant, it is preferably used for a wavelength converting device. However, there is a demand for a ferroelectric having higher properties excellent to those above mentioned performances in order to achieve an effective waveguide in the wavelength converting device

SUMMARY OF THE INVENTION

Therefore, an object of the present invention is to provide a wavelength converting device comprising a substrate and a KLiNbTaO epitaxial layer in place of LNT is deposed thereon by means of a metalorganic chemical vapor-phase deposition or epitaxy (hereinafter referred to as MOCVD) method.

A wavelength converting device according to the present invention comprises:

a substrate;

an epitaxial cladding layer of $K_3Li_{2-x}Nb_{5+x-y}Ta_yO_{15+2x}$ ($-0.4 \leq x \leq 0.20$, $0 \leq y \leq 0.33$) deposited on said substrate by metalorganic compound gases by using a metalorganic chemical vapor-phase deposition method comprising the steps of:

separately sublimating each of organic compounds including lithium, potassium, tantalum and niobium to produce metalorganic compound gases thereof;

introducing each of the metalorganic compound gases onto said substrate disposed in a reactor of a metalorganic vapor phase epitaxial apparatus; and allowing the metalorganic compound gases to react with each other to deposit said $K_3Li_{2-x}Nb_{5+x-y}Ta_yO_{15+2x}$ ($-0.4 \leq x \leq 0.20$, $0 \leq y \leq 0.33$) on said substrate; and an epitaxial waveguide layer of $K_3Li_{2-x'}Nb_{5+x'-y'}Ta_{y'}O_{15+2x'}$ ($-0.4 \leq x' \leq 0.20$, $0 \leq y' \leq 0.33$, $x+0.0005 \leq x' \leq x+0.005$ and $x' \neq x$) deposited on said epitaxial cladding layer by metalorganic compound gases by using said metalorganic chemical vapor-phase deposition method and having a refractive index larger than that of the epitaxial cladding layer.

The above and other objects, features and advantages of the present invention will become more apparent from the following description when taken in conjunction with the accompanying drawings in which a preferred embodiment of the invention is shown by way of illustrative example.

DETAILED DESCRIPTION OF THE PREFERRED EMBODIMENTS

Figure 1:
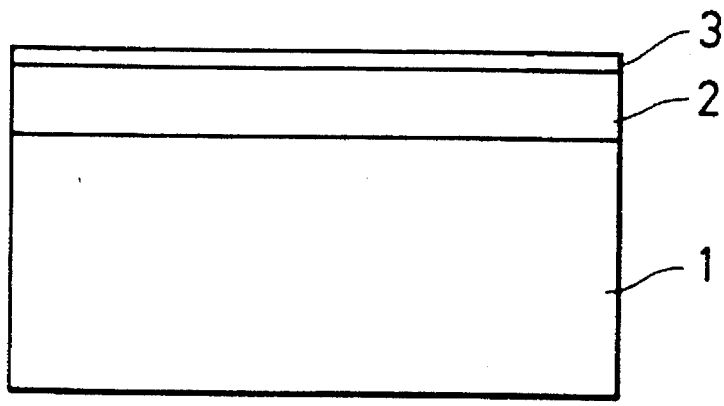
FIGS. 1 and 2 are schematic sectional views showing one and another wavelength converting devices of embodiments according to the present invention respectively.

The preferred embodiments according to the present invention will be described in detail with reference to the accompanying drawings.

Inventors have found that, when deposing a KLiNbTaO epitaxial layer on a substrate in place of LNT by means of a MOCVD apparatus in which the MOCVD method is preformed, such a KLiNbTaO epitaxial layer is suitable for a waveguide of a wavelength converting device and then made the present invention.

First, a substrate is arranged in a reduced-pressure reactor of the MOCVD apparatus to be heated up to a predetermined temperature under a predetermined pressure. Sublimators of the MOCVD apparatus are loaded with four starting materials i.e., dipivaloylmethanato potassium [$K(C_{11}H_{19}O_2)$] (hereinafter referred to as K(DPM)), dipivaloylmethanato lithium [$Li(C_{11}H_{19}O_2)$] (hereinafter referred to as Li(DPM)), trichlorobis(dipivaloylmethanato) niobium (V) [$Nb(C_{11}H_{19}O_2)_2Cl_3$] (hereinafter referred to as $Nb(DPM)_2Cl_3$) and dipivaloylmethanato tantalum [$Ta(C_{11}H_{19}O_2)$] (hereinafter referred to as Ta(DPM)) respectively. These starting materials are heated to predetermined source temperatures and maintained respectively to sublime and become metalorganic compound gases respectively. These metalorganic compound gases are introduced into the reactor by using Ar carrier gases whose flow rates are controlled respectively so as to be provided on the heated substrate. As a result, a single crystal thin film of KLiNbTaO is epitaxially grown which is represented by $K_3Li_{2-x}Nb_{5+x-y}Ta_yO_{15+2x}$ where the subscripts including x and y denote atomic ratios. In a preferred embodiment, the parameters of atomic ratios x and y are determined by ranges $-0.4 \leq x \leq 0.20$ and $0 \leq y \leq 0.33$ respectively.

Moreover, on such a first KLiNbTaO epitaxial of the substrate, a second KLiNbTaO film is formed while changing the atomic ratios differing those of the first film. Namely, the second film of $K_3Li_{2-x'}Nb_{5+x'-y'}Ta_{y'}O_{15+2x'}$ is epitaxially grown on the first film of $K_3Li_{2-x}Nb_{5+x-y}Ta_yO_{15+2x}$ so that the parameters of atomic ratios x' and y' are determined by ranges $-0.4 \leq x' \leq 0.20$, $0 \leq y' \leq 0.33$ respectively under the conditions of $x+0.0005 \leq x' \leq x+0.005$ and $x' \neq x$.

In this way, there is obtained an epitaxial waveguide having a two-layer structure of epitaxial single crystal thin films to be used for a wavelength converting device.

A concrete experience was performed. CVD sources of starting materials were K(DPM), Li(DPM), Nb(DPM)$_2$Cl$_3$ and Ta(DPM) which were disposed and sealed within stainless steel sublimators each provided with a bellows valve. These materials were kept at predetermined temperatures held to plus or minus 1° C. in isothermal-air-bathes respectively and the, were sublimated as reactant gases under a reduced-pressure of 160 Torr. By using Ar carrier gases whose flow rates were controlled, the reactant gases were individually introduced into a lateral-type reactor with a flow channel in the MOCVD apparatus.

The predetermined temperature for K(DPM) in the isothermal-air-bath was selected from a temperature range of 180° C. to 200° C., Li(DPM) was 180° C. to 210° C., Nb(DPM)$_2$Cl$_3$ was 170° C. to 190° C., and Ta(DPM) was 160° to 190° C.

A substrate had been secured onto a quartz tray disposed on an Inconel susceptor in the reactor to be heated to a temperature of about 500° C. to 700° C. by a high frequency coil heating. The surface of the substrate had been polished and finished as a mirror surface.

The reactant material gases or the mixture thereof introduced together with the Ar carrier gases were poured on the surface of the heated substrate as a laminar flow. In this way, various epitaxial cladding layers were deposited on the substrates. For the laminar flow formation, the flow rates of the Ar carrier gases for the material gases were set as follows: The flow rate of gas for K(DPM) was selected from a range of 200 to 400 ml/min., Li(DPM) was 100 to 200 ml/min., Nb(DPM)$_2$Cl$_3$ was 5 to 130 ml/min., and Ta(DPM) was 0 to 60 ml/min. Since the production of reactant gases i.e., oxides from the starting materials was due to the oxidation reaction, oxygen gas was added to the reactant gases at a flow rate of 200 to 400 ml/min. The gas system in the MOCVD apparatus is constructed by using stainless steel tubes which were connected to a vacuum system in such a manner that the pressure of the reactant system was controlled and adjusted by leak-able valves.

The used substrate was made of a tungsten-bronze type crystals such as $K_3Li_2Nb_5O_{15}$, $Ba_6Nb_8Ti_2O_{30}$, $Ba_5Ta_{10}O_{30}$ or $K_2BiNb_5O_{15}$. In addition to these crystals, there may be used a crystal substrate represented by $K_3Li_{2-x''}Nb_{5+x''}O_{15+2x''}$ wherein the parameters of atomic ratios x'' and y'' are in the ranges $-0.4 \leq x'' \leq 0.20$ and $x+0.0005 \leq x'' \leq x+0.005$ respectively under the condition of $x \neq x'' \neq x'$ and x and x' denote parameters used in the first film of $K_3Li_{2-x}Nb_{5+x-y}Ta_yO_{15+2x}$ and the second film of $K_3Li_{2-x'}Nb_{5+x'-y'}Ta_{y'}O_{15+2x'}$ epitaxially grown in turn on the particular substrate.

FIG. 1 shows a slap or planar waveguide i.e., one of examples resulted from the examples above. As shown in the figure, on the +c face or -c face of the substrate 1, a cladding layer 2 is epitaxially grown and deposited which is represented by $K_3Li_{2-x}Nb_{5+x-y}Ta_yO_{15+2x}$ and then a waveguide layer 3 represented by $K_3Li_{2-x'}Nb_{5+x'-y'}Ta_{y'}O_{15+2x'}$ is epitaxially grown and deposited which has a refractive index only larger than that of the epitaxial cladding layer 2.

$K_3Li_{2-x}Nb_{5+x-y}Ta_yO_{15+2x}$ including $K_3Li_2Nb_5O_{15}$ belongs to the tungsten-bronze type crystal as well as $Ba_6Nb_8Ti_2O_{30}$, $Ba_5Ta_{10}O_{30}$, and $K_2BiNb_5O_{15}$ each used for the substrate 1 belong to the same crystal type. Therefore, the cladding layer 2 with a good orientation is epitaxially grown and then the waveguide layer 3 with a low transmission loss is formed on the epitaxial cladding layer.

The resultant wavelength converting device was evaluated. When introducing a fundamental wave into the epitaxial waveguide layer 3 having a large refractive index, the fundamental wave light was optically held in the layer 3, so that this device generates a secondary harmonic from the incident light with a high conversion efficiency. In addition, the resultant wavelength converting device was operated with a high thermal and electrical stability and a high output even when driven by a high load optical power, in comparison with the wavelength converting device comprising a conventional waveguide made of LN, LT or LNT. This is because $K_3Li_{2-x}Nb_{5+x-y}Ta_yO_{15+2x}$ such as $K_3Li_2Nb_5O_{15}$ or the like of the tungsten-bronze type crystal has a high threshold against the optical damage.

Preferably, the parameters x, y and x', y' in atomic ratio ranges of $K_3Li_{2-x}Nb_{5+x-y}Ta_yO_{15+2x}$ and $K_3Li_{2-x'}Nb_{5+x'-y'}Ta_{y'}O_{15+2x'}$ for both the epitaxial layer are determined by the conditions $-0.4 \leq x \leq 0.20$, $0 \leq y \leq 0.33$ and $-0.4 \leq x' \leq 0.20$, $0 \leq y' \leq 0.33$ respectively but $x+0.0005 \leq x' \leq x+0.005$ and $x' \neq x$. Therefore the cladding layer 2 of $K_3Li_{2-x}Nb_{5+x-y}Ta_yO_{15+2x}$ and the waveguide layer 3 of $K_3Li_{2-x'}Nb_{5+x'-y'}Ta_{y'}O_{15+2x'}$ are epitaxially grown and deposited in turn in such a manner that these parameters x, y and x', y' are met within the forgoing conditions.

It is necessary that the epitaxial waveguide layer 3 has a refractive index just larger than that of the epitaxial cladding layer 2 in the wavelength converting device so as to be stably operated against for a minute fluctuation of wavelength of the incident fundamental wave and a change of ambient temperature. The compositions of the epitaxial layers may be selected from the forgoing atomic ratio ranges so as to satisfy the refractive index conditions of both the cladding and waveguide layers.

Additionally, it is necessary for the phase matching condition that the equivalent refractive index $N_F$ of the crystal film 3 with respect to the fundamental wave's wavelength $\lambda_F$ is nearly equal to the equivalent refractive index $N_S$ of the crystal film 3 with respect to the secondary harmonic's wavelength $\lambda_S (=\lambda_F/2)$ in the wavelength converting device. Therefore The composition of the waveguide layer may be epitaxially grown within the forgoing atomic ratio ranges so as to satisfy the refractive index conditions of the crystal film 3. Adversely, the wavelength of the fundamental wave may be selected so as to satisfy the refractive index conditions of the formed crystal film 3 that the equivalent refractive indexes $N_F$ and $N_S$ of the crystal film 3 with respect to the fundamental wave's wavelength $\lambda_F$ and the secondary harmonic's wavelength $\lambda_S$ equal to each other.

In any case, it is necessary that the epitaxial waveguide layer 3 has a refractive index larger than that of the epitaxial cladding layer 2 in the wavelength converting device. In the preferable embodiment to achieve such a refractive index relationship, the parameter in atomic ratio x' for the epitaxial cladding layer 2 is determined within a range $x+0.0005 \leq x' \leq x+0.005$ when $y=0$.

Additionally, the film thickness of the epitaxial waveguide layer 3 is preferably determined within 2 to 4 μm. Precisely, the film thickness of the waveguide layer 3 should be determined in such a manner that the fundamental wave propagates therein in the form of the fundamental mode subject to the wavelengths of both the used fundamental wave and secondary harmonic, and the refractive index of the epitaxial cladding layer 2. Moreover, the film thickness of the epitaxial cladding layer 2 requires 2 μm or more to avoid the leakage of an evanescent wave of the propagating light to the substrate 1.

Figure 2:
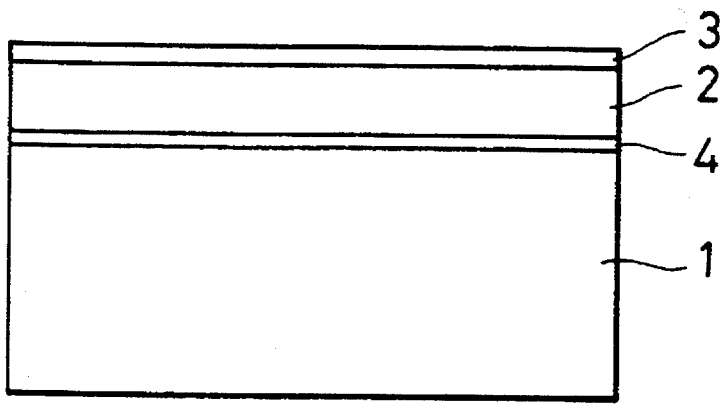

Furthermore, FIG. 2 shows a second embodiment of the wavelength converting device comprising a low cost substrate 1 made of sapphire or magnesium oxide (MgO). On the substrate 1 of sapphire or magnesium oxide (MgO), a buffer layer 4 of $KNbO_3$, $K_3Li_2Nb_5O_{15}$ or $K_3Li_{2-x'''}Nb_{5+x'''}O_{15+2x'''}$ ($-0.4 \leq x''' \leq 0.20$, $x+0.0005 \leq x''' \leq x+0.005$, $x \neq x''' \neq x$) is epitaxially grown and deposited at a critical film thickness of 0.1 to 0.3 μm, and after that, an cladding layer 2 of $K_3Li_{2-x}Nb_{5+x-y}Ta_yO_{15+2x}$ is epitaxially grown and deposited on the epitaxial buffer layer. Then a waveguide layer 3 of $K_3Li_{2-x}Nb_{5+x'-y}Ta_yO_{15+2x'}$ is epitaxially grown and deposited on the epitaxial cladding layer 2. The surface orientations of sapphire and MgO substrates are R face and (100) plane respectively. According to the second embodiment, there is also obtained a wavelength converting device having a high threshold of optical damage which is operatable with a high thermal and electrical stability and a high output at high conversion efficiency.

Figure 3:
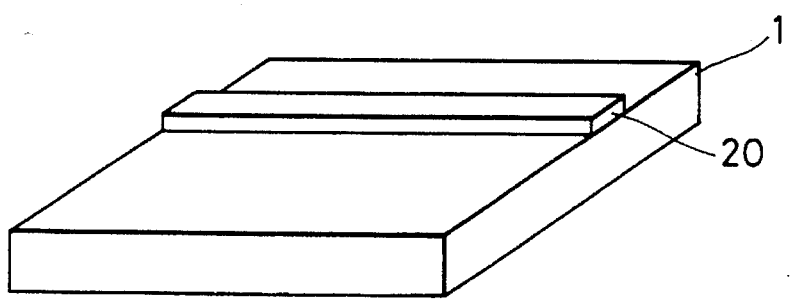
FIGS. 3 to 5 are schematic perspective views showing the other wavelength converting devices of embodiments according to the present invention respectively.
Figure 4:
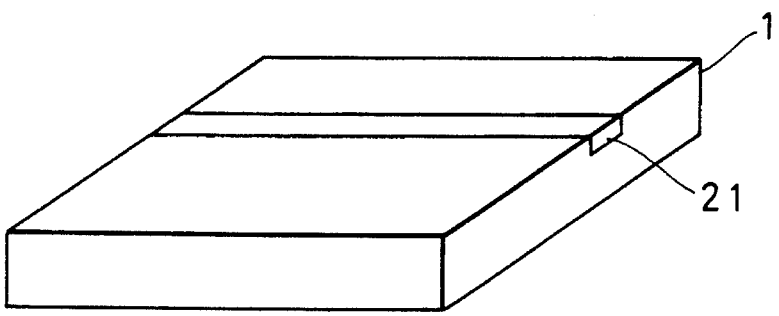
Figure 5:
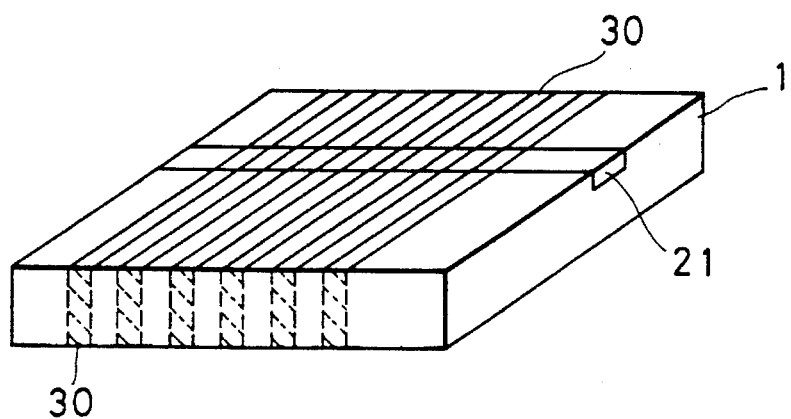

In practice, one of the forgoing embodiments of the slab waveguide layer 3 is etched by an etchant to be deformed into a ridge type waveguide as shown in FIG. 3 in which the ridge type waveguide 20 including at least the waveguide layer of $K_3Li_{2-x}Nb_{5+x'-y}Ta_yO_{15+2x'}$ is provided on the substrate 1. Alternatively, a buried type waveguide as shown in FIG. 4 may be formed from the slab waveguide layer 3 by means of a thermal dispersion method, an ion exchange method, an ion injecting method, or an electron beam irradiation method. The wavelength converting device of FIG. 4 comprises the substrate 1 and the buried type waveguide 21 having a high refractive index larger than those of the ambient layers and the substrate. In addition, a loaded type waveguide similar to the buried type waveguide 21 may be formed from the slab waveguide layer by means that a $SiO_2$ stripe is loaded on the waveguide layer 3. In these ways, each waveguide may be formed as a three-dimensional or channel type waveguide in the wavelength converting device.

Furthermore, according to the present invention, a quasi-phase matching (QPM) wavelength converting device may be formed on the basis of the device shown in FIG. 4 in which a plurality of polarization inversion portions 30 are periodically formed in the three-dimensional waveguide 21 in its extending direction. Generally, the second harmonic output due to a nonlinear optical effect has such a property that as this output propagates, it periodically reaches the peak and trough levels every coherence length. Quasi-phase matching method utilizes this property to alternately invert the sign of a polarization wave that is generated every coherence length, and adds the second harmonic outputs to increase the total output by the polarization inversion portions i.e., the so-called periodic domain inversion structure in the QPM wavelength converting device. The present invention is applicable to various phase matching methods deformed in the film thickness of waveguide or added with an over-layer onto the waveguide layer.

As previously stated, the present invention of the wavelength converting device comprises a waveguide made of $K_3Li_{2-x}Nb_{5+x-y}Ta_yO_{15+2x}$ crystal thin film which is epitaxially grown on a pertinent substrate by using a MOCVD method. Therefore, the wavelength converting device is capable of being operated with a high thermal and electrical stability and a high output even when driven by a high load optical power, in comparison with the wavelength converting device comprising a conventional waveguide made of LN, LT, or LNT. Furthermore, since the controlling of the flow rates of carrier gases facilitates to change the component ratios of crystals to be epitaxially grown on the substrate in the MOCVD method, the manufacturing process for the wavelength converting device is accurately controlled in its waveguide's refractive index and its film thickness.

What is claimed is:

1. A wavelength converting device comprising:

a substrate;

an epitaxial cladding layer of $K_3Li_{2-x}Nb_{5+x-y}Ta_yO_{15+2x}$ ($-0.4 \leq x \leq 0.20$, $0 \leq y \leq 0.33$) deposited on said substrate by metalorganic compound gases by using a metalorganic chemical vapor-phase deposition method comprising the steps of:

separately sublimating each of organic compounds including lithium, potassium, tantalum and niobium to produce metalorganic compound gases thereof;

introducing each of the metalorganic compound gases onto said substrate disposed in a reactor of a metalorganic vapor phase epitaxial apparatus; and allowing the metalorganic compound gases to react with each other to deposit said $K_3Li_{2-x}Nb_{5+x-y}Ta_yO_{15+2x}$ ($-0.4 \leq x \leq 0.20$, $0 \leq y \leq 0.33$) on said substrate; and an epitaxial waveguide layer of $K_3Li_{2-x}Nb_{5+x'-y}Ta_yO_{15+2x'}$ ($-0.4 \leq x' \leq 0.20$, $0 \leq y' \leq 0.33$, $x+0.0005 \leq x' \leq x+0.005$ and $x' \neq x$) deposited on said epitaxial cladding layer by metalorganic compound gases by using said metalorganic chemical vapor-phase deposition method and having a refractive index larger than that of the epitaxial cladding layer.

2. A wavelength converting device according to claim 1, wherein said substrate is made of a tungsten-bronze type crystal.

3. A wavelength converting device according to claim 2, wherein said substrate is made of a material selected from the group consisting of $K_3Li_{2-x''}Nb_{5+x''}O_{15+2x''}$ ($-0.4 \leq x'' \leq 0.20$, $x+0.0005 \leq x'' \leq x+0.005$, and $x \neq x' \neq x''$), $Ba_6Nb_8Ti_2O_{30}$, $Ba_5Ta_{10}O_{30}$ and $K_2BiNb_5O_{15}$.

4. A wavelength converting device according to claim 1, wherein said substrate is made of sapphire or magnesium oxide, further comprising an epitaxial buffer layer of $KNbO_3$ or $K_3Li_{2-x'''}Nb_{5+x'''}O_{15+2x'''}$ ($-0.4 \leq x''' \leq 0.20$, $x+0.0005 \leq x''' \leq x+0.005$, $x \neq x''' \neq x'$) formed at a critical film thickness between said substrate and said epitaxial cladding layer.

5. A wavelength converting device comprising:

a substrate;

an epitaxial cladding layer of $K_3Li_{2-x}Nb_{5+x-y}Ta_yO_{15+2x}$ ($-0.4 \leq x \leq 0.20$, $0 \leq y \leq 0.33$) deposited on said substrate by metalorganic compound gases including lithium, potassium, tantalum and niobium respectively by using a metalorganic chemical vapor-phase deposition method; and an epitaxial waveguide layer of $K_3Li_{2-x'}Nb_{5+x'-y'}Ta_{y'}O_{15+2x'}$ ($-0.4 \leq x' \leq 0.20$, $0 \leq y' \leq 0.33$, $x+0.0005 \leq x' \leq x+0.005$ and $x' \neq x$) deposited on said epitaxial cladding layer by metalorganic compound gases including lithium, potassium, tantalum and niobium respectively by using said metalorganic chemical vapor-phase deposition method and having a refractive index larger than the of the epitaxial cladding layer.

* * * * *